United States Patent [19]

Logan

[11] 4,193,470
[45] Mar. 18, 1980

[54] FLUID PROPELLED VEHICULAR SYSTEM

[76] Inventor: Russell J. Logan, 29007 Atherstone, Spring, Tex. 77373

[21] Appl. No.: 959,511

[22] Filed: Nov. 13, 1978

[51] Int. Cl.² .............................................. B60V 1/04
[52] U.S. Cl. ........................................ 180/117; 46/44; 104/23 FS; 104/134; 414/676
[58] Field of Search ................... 180/117, 116, 125, 2; 414/676; 104/134, 23 FS, 155; 46/1 J, 44, 116

[56] References Cited
U.S. PATENT DOCUMENTS

| | | | |
|---|---|---|---|
| 3,251,595 | 5/1966 | Morgan | 46/1 J |
| 3,367,658 | 2/1968 | Bayha | 46/44 |
| 3,820,467 | 6/1974 | Burdick | 414/676 |
| 3,896,735 | 7/1975 | Fischer | 104/23 FS |

Primary Examiner—John A. Pekar
Attorney, Agent, or Firm—Pravel, Gambrell, Hewitt, Kirk, Kimball & Dodge

[57] ABSTRACT

A fluid propelled ground effect vehicle lifted by pressurized fluid directed upwardly through openings in a support floor. The vehicle body is propelled across the support floor by exiting pressurized fluid trapped in a receiving chamber underneath the vehicle body and discharged through an outlet in the chamber. The vehicle body is steered by controlling the direction of exit of the pressurized fluid as it leaves the receiving chamber.

19 Claims, 4 Drawing Figures

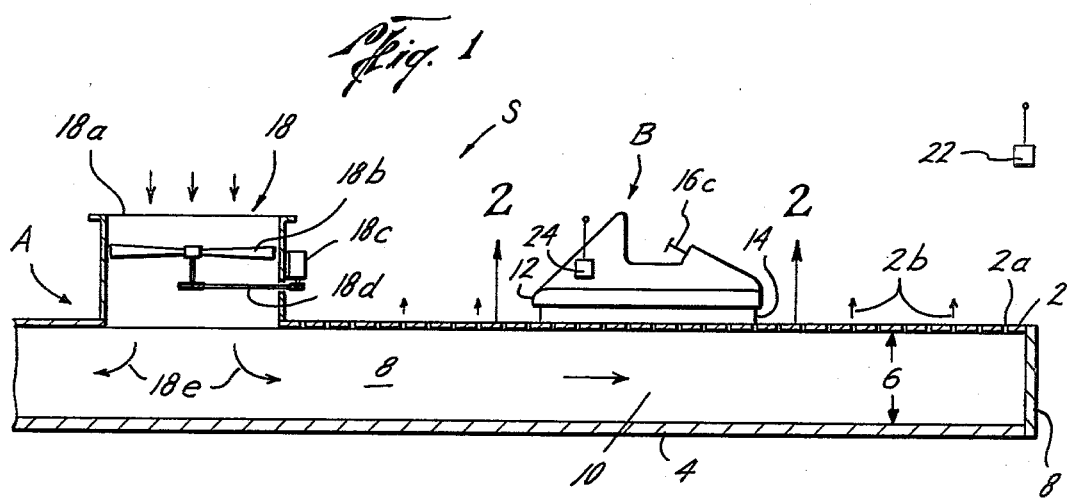
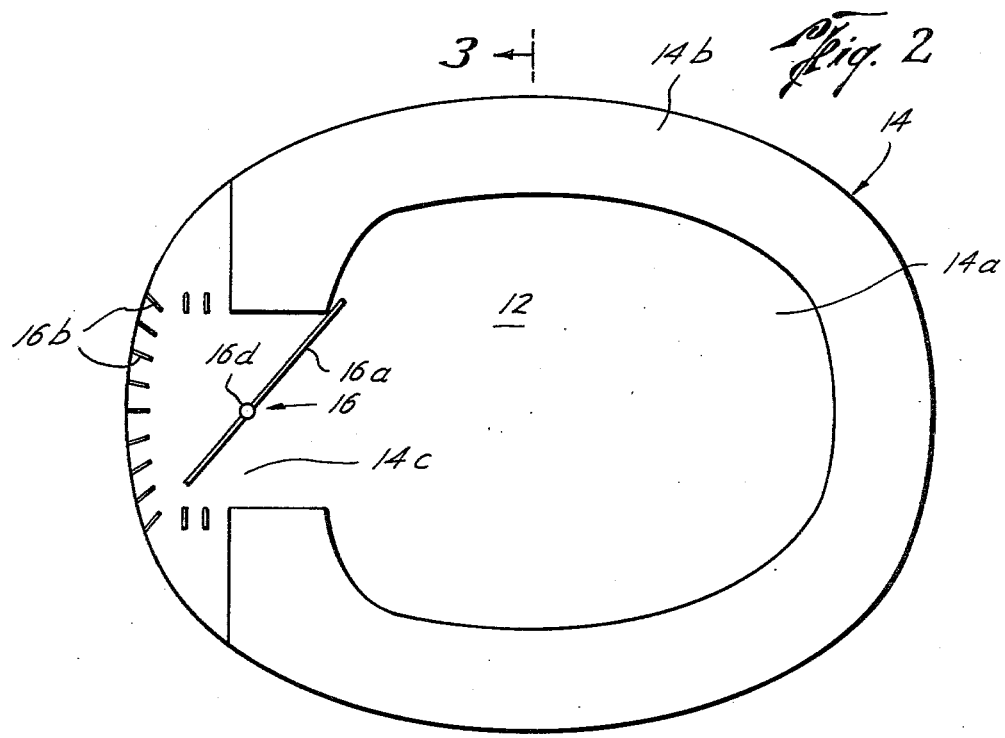
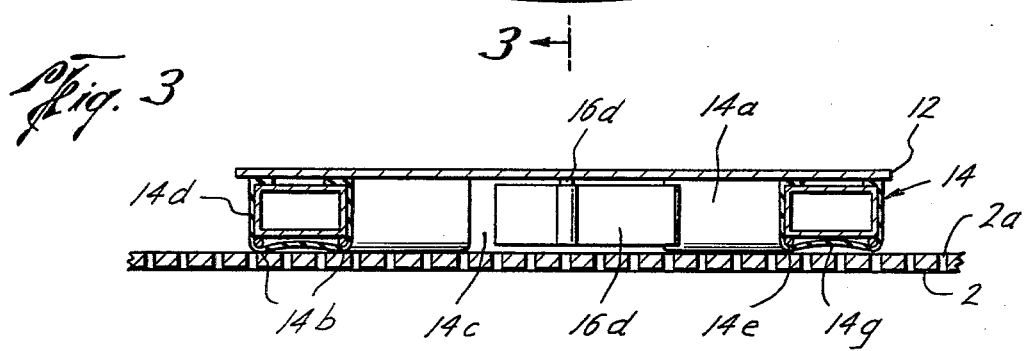

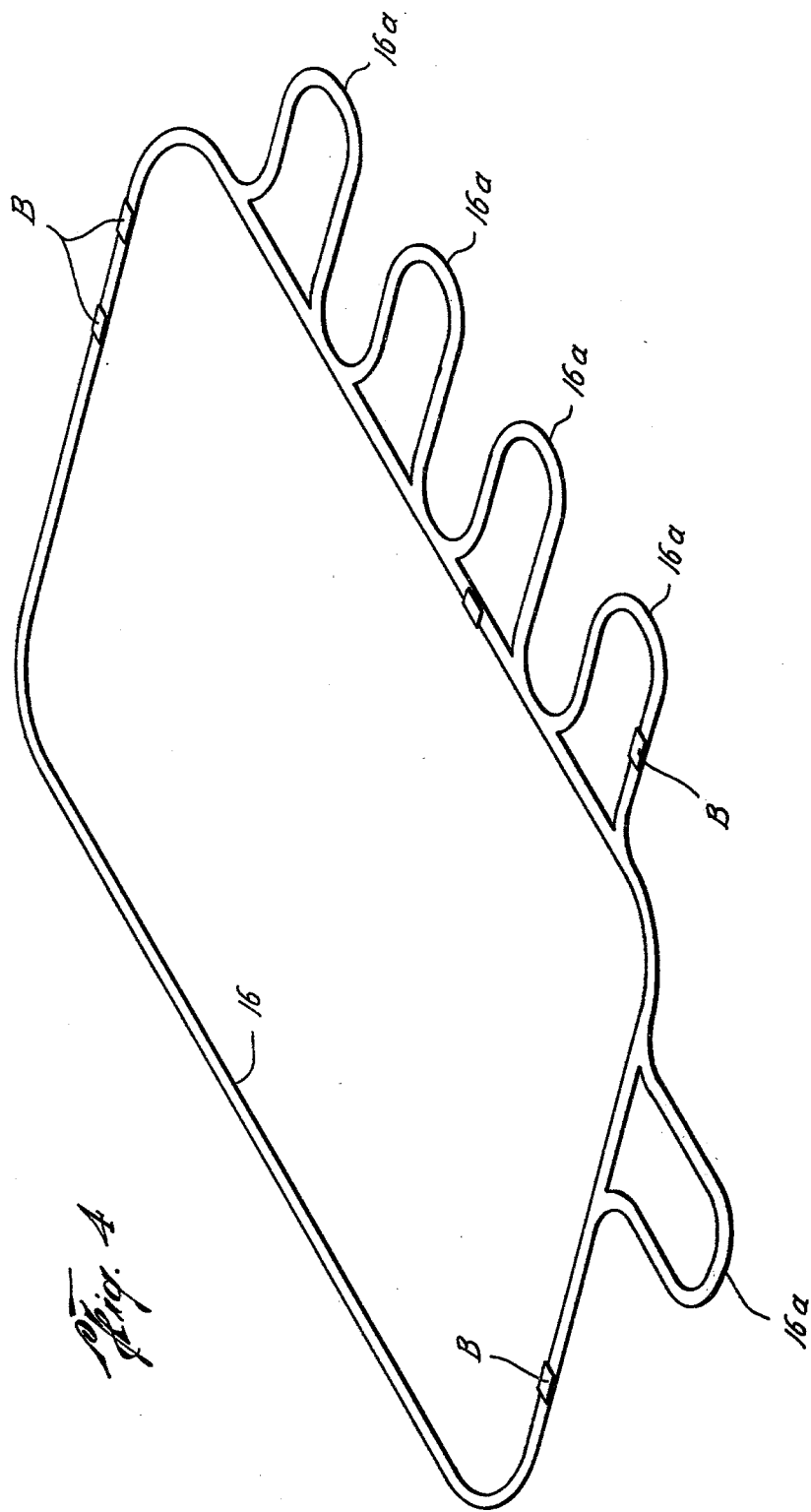

FLUID PROPELLED VEHICULAR SYSTEM

TECHNICAL FIELD OF THE INVENTION

The technical field of this invention is fluid propelled ground effect vehicles lifted by pressurized fluid directed upwardly through openings in a support floor. The fluid propelled vehicle of this invention may be used for carrying passengers or cargo or used as an amusement ride.

PRIOR ART

Ground effect vehicles to carry individual passengers for pleasure or amusement are taught by U.S. Pat. No. 3,292,721 of Dobson and U.S. Pat. No. 3,416,626 of Nagamatsu. The Dobson reference discloses a ground effect vehicle for the pleasure use having a built-in fan for providing lift. The Nagamatsu reference teaches the use of an external air supply, such as a household vacuum cleaner, forcing air downwardly through a platform to lift the platform off the ground. The use of an air cushion-type undercarriage for aircraft is taught by U.S. Pat. No. 3,964,698 of Earl. The vehicles of these inventions are all self-contained having power sources providing lift by forcing air downwardly from the vehicle.

The concept of using steering vanes to control the direction of an air cushion vehicle are disclosed by U.S. Pat. No. 3,605,937 of Kirwan and U.S. Pat. No. 3,669.212 of Desbarats. The kirwan reference teaches the use of a steering vane to control air exiting an air duct, while the Desbarats reference teaches the use of moveable baffles mounted within an air tunnel to achieve steering. The steering systems taught by these patents are adapted for use with self-powered vehicles which provide their own lift and/or thrust.

The use of pressurized air supplied through the floor or support surface to reduce friction in cargo handling are disclosed by U.S. Pat. Nos. 3,209,929 and 3,650,218. The inventions disclosed by these patents are for the purpose of reducing friction of cargo or crates being moved across the surface rather than for the purpose of lifting the cargo from the surface with a cushion of air.

SUMMARY OF THE INVENTION

Briefly, the present invention provides a new, improved fluid propelled vehicular system which is powered by upwardly directed pressurized fluid, usually air, delivered through a support floor having openings therein, providing lift and propulsion for a vehicle body. The vehicle body has a platform portion and skirt portion, forming a fluid receiving chamber, or reservoir, for the pressurized fluid. The skirt portion of the vehicle body has a surface area to respond to the force exerted by the upwardly directed pressurized fluid and, further, has an outlet permitting pressurized fluid to exit the receiving chamber, causing movement of the vehicle body across the support floor. Steering of the vehicle body is accomplished by placing a rudder adjacent the outlet in the skirt portion, thereby controlling the direction of flow of the exiting fluid. A vehicluar system of the present invention is especially adapted for carrying passengers or cargo or for use in an amusement park setting.

BRIEF DESCRIPTION OF THE VIEWS

FIG. 1 is an elevation view, taken partly in cross-section, of a fluid propelled vehicular system according to the present invention;

FIG. 2 is a cross-sectional view taken along line 2—2 of FIG. 1;

FIG. 3 is a cross-sectional view taken along line 3—3 of FIG. 2; and

FIG. 4 is a schematic diagram of a fluid propelled vehicular system for use in the transportation of passengers or cargo.

DESCRIPTION OF THE PREFERRED EMBODIMENT

In the drawings, a fluid propelled vehicular system, generally designated by the letter S, according to the present invention is set forth in (FIG. 1). Vehicular system S includes a pressurized fluid delivery assembly, generally designated by the letter A, and a vehicle body, generally designated by the letter B.

Pressurized fluid delivery assembly A further includes a support floor 2 elevated from a suitable foundation or support base 4 at a predetermined height 6. A barrier 8, or sidewall, extends around the perimeter of support floor 2, downward to support base 4, forming an enclosure 10 for pressurized fluid, usually air. Support floor 2 has a plurality of openings 2a across the surface thereof through which the pressurized fluid is forced in the direction of arrows 2b.

Vehicle body B includes a platform portion 12 and a skirt portion 14 which form fluid receiving chamber 14a. Chamber 14a receives a volume of pressurized air directed upwardly through openings 2a in support floor 2. Chamber 14a, further, is of a large enough volume to contain sufficient pressurized air and has an outlet 14c, for the exit of pressurized air therefrom, of sufficient size to permit movement and steering of vehicle body B. As seen in FIG. 2, skirt 14 extends generally around the perimeter of platform 12 and has sufficient surface area 14b to respond, or to be lifted, by upwardly directed pressurized fluid from openings 2a in the floor 2. Skirt 14, further, has end portions forming the outlet 14c which permits the escape of pressurized fluid from chamber 14a, causing movement of vehicle body B across support floor 2.

Skirt portion 14, as shown in FIG. 3, further includes skirt inner frame 14d and support rods 14e fixed to the inner and outer perimeter, respectively, of frame 14d. Rods 14e support the weight of vehicle body B in the absence of fluid pressure. Although skirt inner frame 14d is normally hollow, it is understood that it could also be a cage or of solid construction. Friction reducing means 14f is sheeting having a low coefficient of friction made of a synthetic resin material like polytetrafluoroethylene, such as that sold by DuPont under the trademark Teflon. Friction reducing means 14f is stretched around skirt inner frame 14d and support rods 14e, allowing vehicle body B to be easily pushed across support floor 2 in the absence of fluid pressure. Upwardly directed pressurized fluid acts on the surface area 14b of skirt portion 14 causing a pocket 14g to be formed in friction reducing means 14f between support rods 14e.

A rudder means 16, for steering vehicle body B, has a movable vane 16a rotatably mounted at 16d in outlet 14c of skirt portion 14 to direct the flow of pressurized fluid as it exits receiving chamber 14a. Rudder means 16 further includes a plurality of radially directed deflection vanes 16b rigidly mounted at the exit portion of outlet 14c. Movable vane 16a generally directs the flow of exiting fluid from outlet 14c for steering of the vehicle B. Deflection vanes 16b are additionally provided to further confine flow of the exiting fluid, causing a more positive response to steering commands. Rudder means 16 is connected to a steering wheel 16c on vehicle body B or other suitable steering means to control the direction of travel of the vehicle B. Steering of vehicle body B can also be accomplished from a location remote from the vehicle B by use of a radio transmitter 22 and radio receiver 24 or other suitable system.

Blower means 18 of pressurized fluid delivery system A is mounted vertically on support floor 2, receiving outside air at fluid intake 18a and forcing it downward in the direction of arrows 18e into pressurized fluid enclosure 10. Blower means 18 includes fan 18b driven by fan belt 18d which is powered by electric motor 18c or other suitable source. It is understood that blower means 18 may be placed in some suitable location other than that shown in FIG. 1, and fluid delivery system A could utilize more than one blower means 18.

The exterior design of vehicle body B in FIG. 1 is structured similarly to that of an automobile. This shape may vary to provide some other ornamental design or may be of a functional configuration such as to carry cargo or multiple passengers.

In operation, outside fluid, usually air, enters blower means 18 through intake 18a where fan 18b forces the fluid into the pressurized fluid enclosure 10. The pressurized air in enclosure 10 is forced upwardly through openings 2a of support floor 2. As the pressurized air engages surface area 14b of skirt portion 14, vehicle body B responds by rising from the surface of support floor 2 on a cushion of pressurized air. Air entering fluid receiving chamber 14a remains pressurized and is forced to exit through outlet 14c, causing movement of vehicle body B across support floor 2. The movement of vehicle B caused by the exit of pressurized fluid includes both propulsion and steering. Movement of vane 16a of rudder means 16 causes the fluid to be directed generally toward deflection vanes 16b. Deflection vanes 16b impart a positive direction to the exiting air as it leave vehicle body B, causing better response to the steering of vehicle body B than can be accomplished by a single movable rudder vane. In the absence of fluid pressure in vehicular system S, friction reducing means 14f allows vehicle body B to be easily moved across support floor 2 for storage, service or the like.

The fluid propelled vehicular system S of the present invention may be constructed so that support floor 2 is configured as an arena, permitting a plurality of vehicle bodies B to be operated simultaneously as an amusement ride. Vehicular system S may also be constructed, as illustrated in FIG. 4, providing a main travel path 16 and numerous subsidiary paths 16a. Subsidiary paths 16a could be storage bays in a warehouse or passenger depots in a passenger transport system in a parking lot, amusement park or other public facility. It is understood that several blowers 18 could be placed at various locations along travel path 16.

The foregoing disclosure and description of the invention are illustrative and explanatory thereof, and various changes in the size, shape and materials as well as in the details of the illustrated construction may be made without departing from the spirit of the invention.

I claim:

1. A fluid propelled vehicular system comprising:
   a pressurized fluid delivery assembly having a support floor elevated from a support base and a perimeter barrier forming an enclosure for pressurized fluid received from a suitable source, said support floor having a plurality of openings across the surface thereof to permit the passage of pressurized fluid therethrough;
   a vehicle body having a platform portion and a skirt portion, said platform portion and skirt portion forming a fluid receiving chamber, said skirt having a surface area to respond to the force exerted by upwardly directed pressurized fluid thereagainst, said skirt having an outlet adjacent said chamber permitting pressurized fluid to exit from said chamber, to cause movement of said vehicle body over said support floor; and
   a rudder means having a movable vane rotatably mounted in said outlet to control the direction of movement of said vehicle body by controlling the direction of exit of fluid from said chamber.

2. The structure set forth in claim 1, further including:
   blower means to force fluid into said pressurized fluid delivery assembly and outwardly through said openings in said support floor for lifting and controlling the direction of said vehicle body.

3. The structure set forth in claim 2, wherein said rudder means further comprises:
   a plurality of deflection vanes mounted adjacent said outlet to direct the flow of fluid from said chamber and control the direction of said vehicle body.

4. The structure set forth in claim 1, wherein:
   said fluid receiving chamber forms a reservoir for storing pressurized fluid for movement of said vehicle body.

5. The structure set forth in claim 1, wherein said vehicle body further includes:
   a seat means for carrying a passenger.

6. The structure set forth in claim 1, wherein said vehicle body further includes:
   a cargo carrying means for transport of cargo.

7. The structure set forth in claim 1, wherein said rudder means further includes:
   a remote steering means whereby said rudder means can be controlled from a location remote from said vehicle housing.

8. The structure set forth in claim 1, wherein:
   the pressurized fluid is air.

9. The structure set forth in claim 1, wherein:
   said support floor is of a size to permit a plurality of vehicle bodies to be operated simultaneously thereon, for games, amusement and the like.

10. The structure set forth in claim 1, wherein:
    said support floor is of a predetermined travel path to cause said vehicle body to move therealong in a predetermined travel path for delivery of passengers, cargo and the like.

11. The structure set forth in claim 1, wherein said skirt further comprises:
    a friction reducing means to allow said vehicle body to be moved across said support floor in the absence of fluid pressure.

12. A fluid propelled ground effect vehicle lifted by pressurized fluid directed upwardly through openings in a support floor comprising:
    a vehicle body having a platform portion and a skirt portion, said platform portion and skirt portion forming a fluid receiving chamber, said skirt having a surface area to respond to the force exerted by upwardly directed pressurized fluid, said skirt having an outlet adjacent said chamber permitting pressurized fluid to exit from said chamber to cause movement of said vehicle body over the support floor; and a rudder means having a moveable vane rotatably mounted in said outlet to control the direction of movement of said vehicle body by controlling the direction of exit of fluid from said chamber.

13. The structure set forth in claim 12, wherein said rudder means further comprises:

a plurality of deflection vanes mounted adjacent said outlet to direct the flow of fluid from said chamber and control the direction of said vehicle body.

14. The structure set forth in claim 12, wherein:

said fluid receiving chamber forms a reservoir for storing pressurized fluid for movement of said vehicle body.

15. The structure set forth in claim 12, wherein said vehicle body further includes:

a seat means for carrying a passenger.

16. The structure set forth in claim 12, wherein said vehicle body further includes:

a cargo carrying means for transport of cargo.

17. The structure set forth in claim 12, wherein said rudder means further includes:

a remote steering means whereby said rudder means can be controlled from a location remote from said vehicle housing.

18. The structure set forth in claim 12, wherein said rudder means further comprises:

a remote steering means whereby said rudder means can be controlled automatically from a location remote from said vehicle housing.

19. The structure set forth in claim 12, wherein said skirt further comprises:

a friction reducing means to allow said vehicle body to be moved across said support floor in the absence of fluid pressure.

* * * * *